(12) United States Patent
Koh et al.

(10) Patent No.: US 10,550,905 B2
(45) Date of Patent: Feb. 4, 2020

(54) INTEGRATED WHEEL SPEED AND BRAKE PAD WEAR MONITORING SYSTEM

(71) Applicant: Robert Bosch GmbH, Stuttgart (DE)

(72) Inventors: Ket Seng Koh, Livonia, MI (US); Thomas Loebe, Eisenach (DE); Martin Koegel, Horselberg-Hainich (DE); Helmut Binder, Heilbronn (DE); Robert Kaster, White Lake, MI (US); Walter Heinrich, Novi, MI (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/529,193

(22) PCT Filed: Nov. 12, 2015

(86) PCT No.: PCT/US2015/060258
§ 371 (c)(1),
(2) Date: May 24, 2017

(87) PCT Pub. No.: WO2016/089570
PCT Pub. Date: Jun. 9, 2016

(65) Prior Publication Data
US 2017/0335912 A1    Nov. 23, 2017

Related U.S. Application Data

(60) Provisional application No. 62/087,301, filed on Dec. 4, 2014.

(51) Int. Cl.
*F16D 66/02*    (2006.01)
*B60T 17/22*    (2006.01)
*F16D 66/00*    (2006.01)

(52) U.S. Cl.
CPC .......... *F16D 66/022* (2013.01); *B60T 17/22* (2013.01); *F16D 66/024* (2013.01); *F16D 66/026* (2013.01); *F16D 2066/003* (2013.01)

(58) Field of Classification Search
CPC .... F16D 66/003; F16D 66/024; F16D 66/026; F16D 2066/003; F16D 66/022; B60T 17/22

See application file for complete search history.

(56) References Cited

U.S. PATENT DOCUMENTS 4,076,330 A * 2/1978 Leiber .................... B60T 8/329
                                                       188/1.11 R
5,637,794 A * 6/1997 Hanisko ................ F16D 66/026
                                                       340/453

(Continued)

FOREIGN PATENT DOCUMENTS

CN    1335244 A    2/2002
GB    2279713 A    11/1995

(Continued)

OTHER PUBLICATIONS

International Search Report and Written Opinion for Application No. PCT/US2015/060258 dated Feb. 29, 2016, (11 pages).

(Continued)

*Primary Examiner* — Bradley T King
(74) *Attorney, Agent, or Firm* — Michael Best & Friedrich LLP (57) ABSTRACT

An integrated monitoring system for a vehicle including a brake pad wear sensor and a wheel speed sensor. A wheel speed sensor signal line is connected between the wheel speed sensor and an electronic control unit. A wheel speed power line is connected between the wheel speed sensor, the brake pad wear sensor, and the electronic control unit. The electronic control unit is configured to monitor the wheel speed sensor signal line for a signal indicative of a wheel speed and monitors the wheel speed power line for a signal indicative of a brake pad condition.

12 Claims, 9 Drawing Sheets

(56) References Cited

U.S. PATENT DOCUMENTS

| | | | |
|---|---|---|---|
| 6,282,954 B1* | 9/2001 | Ott | F16D 66/021 |
| | | | 180/197 |
| 6,360,850 B1* | 3/2002 | Odisho | F16D 66/024 |
| | | | 188/1.11 L |
| 6,512,453 B1 | 1/2003 | Leiber et al. | |
| 7,819,210 B2 | 10/2010 | Tonoli et al. | |
| 7,837,278 B2 | 11/2010 | Nilsson | |
| 8,712,639 B2 | 4/2014 | Lu et al. | |
| 2001/0052727 A1 | 12/2001 | Betts | |
| 2005/0241894 A1 | 11/2005 | Baumgartner et al. | |
| 2011/0130926 A1 | 6/2011 | Lu et al. | |
| 2011/0175438 A1 | 7/2011 | Mlynarczyk et al. | |
| 2012/0277976 A1 | 11/2012 | Skoff | |
| 2013/0073250 A1 | 3/2013 | Acker | |
| 2015/0152931 A1* | 6/2015 | Moore | F16D 66/022 |
| | | | 188/1.11 L |

FOREIGN PATENT DOCUMENTS

| | | |
|---|---|---|
| JP | H01299334 A | 12/1989 |
| JP | 2002303344 A | 10/2002 |
| JP | 2003014020 A | 1/2003 |
| JP | 2009019690 A | 1/2009 |

OTHER PUBLICATIONS

Office Action from the Japanese Patent Office for Application No. 2017-529696 dated Jul. 30, 2018 (11 pages).

Notice of Preliminary Rejection from the Korean Intellectual Property Office for Application No. 10-2017-7018370 dated Aug. 28, 2018 (10 pages).

First Office Action from the National Intellectual Property Administration, P.R. China for Application No. 201580075421.3 dated Apr. 30, 2019 (14 pages).

* cited by examiner

INTEGRATED WHEEL SPEED AND BRAKE PAD WEAR MONITORING SYSTEM

CROSS-REFERENCE TO RELATED CASES

This application claims the benefit of U.S. Provisional Patent Application No. 62/087,301, filed Dec. 4, 2014, the entire contents of which are incorporated herein by reference.

BACKGROUND

The present invention relates to wheel speed sensors and brake pad wear sensors for vehicles.

SUMMARY

A wheel speed sensor provides a signal indicative of rotational wheel speed to an electronic control unit (ECU). The ECU processes the signal from the wheel speed sensor and transmits wheel speed information to other vehicle systems, such as, for example, an electronic stability control system (ESC). Additionally, a brake pad wear sensor indicates when a brake pad is deteriorated. The ECU also monitors the brake pad wear sensor and activates an indicator to alert a driver that the brake pads are in need of replacement. The wheel speed sensor and the brake pad wear sensor may be located in close proximity with each other.

Embodiments of the invention partially consolidate electrical connections with the wheel speed sensor and the brake pad wear sensor and route to a common ECU. Consolidating the electrical connections generates cost and weight savings by reducing routing components, shortening the installation time, and simplifying control. A portion of the control circuit for the wheel speed sensor and a portion of the control circuit for the brake pad wear sensor may also be integrated. However, some forms of integration can cause interference on a signal line of the wheel speed sensor. For example, a system that integrates the wheel speed sensor and the brake pad wear sensor on a common wiring harness with a common signal path is susceptible to disturbances caused by an open loop on the brake pad wear sensor. In various configurations, the open loop acts as an antenna and degrades the signal quality from the wheel speed sensor. In addition, intermittent contacts between open ends on the open loop may cause random and rapid changes in the signal from the wheel speed sensor. To reduce exposure to interference on the wheel speed sensor signal line, the brake pad wear sensor signal line is integrated with the wheel speed sensor power line. In the following description, an integrated system is provided to combine a portion of the circuitry for the wheel speed sensor with a portion of the circuitry for the brake pad wear sensor without causing deleterious interference on the integrated system.

In one embodiment, the invention provides an integrated monitoring system for a vehicle including a brake pad wear sensor, a wheel speed sensor, and an electronic control unit. A wheel speed sensor signal line is connected between the wheel speed sensor and the electronic control unit. A power line is connected between the wheel speed sensor, the brake pad wear sensor, and the electronic control unit. The electronic control unit is configured to monitor the wheel speed sensor signal line for a signal indicative of a wheel speed and to monitor the power line for a signal indicative of a brake pad condition.

In another embodiment, the invention provides a method of monitoring an integrated brake pad wear sensor and a wheel speed sensor on a vehicle. The method includes connecting a signal line between the wheel speed sensor and an electronic control unit and connecting a power line between the wheel speed sensor, the brake pad wear sensor, and the electronic control unit. The electronic control unit monitors the signal line for a signal indicative of a wheel speed and monitors the power line for a signal indicative of a brake pad condition.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
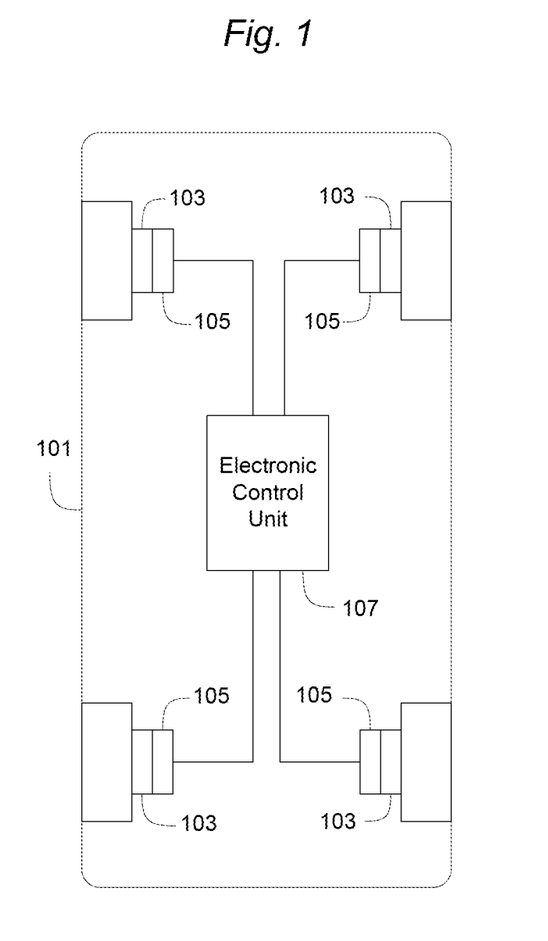
FIG. 1 is a schematic diagram of a vehicle equipped with an integrated wheel speed sensor and brake pad wear sensor.

FIG. 1 illustrates a vehicle 101 equipped with an integrated monitoring system including a wheel speed sensor 103 and a brake pad wear sensor 105 on each of four vehicle wheels. The vehicle 101 includes an electronic control unit (ECU 107) that is electrically connected to the wheel speed sensor 103 and the brake pad wear sensor 105. The ECU 107 communicates with the wheel speed sensor 103 and the brake pad wear sensor 105. As illustrated, each wheel of the vehicle 101 may be equipped with the wheel speed sensor 103 and the brake pad wear sensor 105. In such an embodiment, the vehicle 101 may have multiple ECUs each adapted to control both the wheel speed sensor 103 and the brake pad wear sensor 105 from each wheel. In other embodiments, such as the one illustrated, the ECU 107 may control and coordinate the wheel speed sensor 103 and the brake pad wear sensor 105 from each wheel. In the description that follows, the wheel speed sensor 103, the brake pad wear sensor 105, and the ECU 107 are described singularly.

However, it should be noted that the description may also apply to multiple devices in various connections and configurations. Further, it should be noted that the vehicle 101 may include various types of vehicles including, for example, automobiles, motorcycles, trucks, and others.

In one embodiment, the wheel speed sensor 103 may incorporate a Hall sensor or Magneto-Resistive principles to measure the rotational speed of a wheel. The wheel speed sensor 103 may include a magnetic rotary encoder or a toothed steel tone ring or other sensors adapted to sense rotary motion. In addition, the wheel speed sensor 103 may use a gear attached to a rotating wheel with a sensing element that is attached to a stationary location on the vehicle 101. The sensing element may sense teeth of the gear as they rotate past the sensing element. In such a construction, the wheel speed sensor 103 may use an optical sensing element or a magnetic sensing element. The wheel speed sensor 103 may be capable of providing information such as a rotational direction, a sensor status, and an air gap condition to the ECU 107. The wheel speed sensor 103 may be digitalized and operate with several protocols including, for example, pulse width modulation or VDA (Verband der Automobilindustrie) protocols. In some embodiments, a signal from the wheel speed sensor 103 to the ECU 107 is processed by an application specific integrated circuit (ASIC) located in or proximal to the wheel speed sensor 103. In such a construction, the signal from the wheel speed sensor 103 is digitized before transmission to the ECU 107.

In some constructions, the brake pad wear sensor 105 includes a wire, a resistor, and a conductive punch grid. The brake pad wear sensor 105 detects a brake pad condition and may be designed to wear with the brake pad. For example, the brake pad wear sensor 105 may include an abradable component (e.g., an abradable wire loop) that is either embedded in the brake pad or clipped on the backing plate of the brake pad. The abradable component is then electrically connected to the ECU 107. When the brake pad reaches a certain thickness, the abradable component wears with the brake pad and a change in resistance in the brake pad wear sensor occurs. The ECU 107 detects the change in resistance and thereby determines that the brake pad has worn to the position of the abradable component.

The brake pad wear sensor 105 may contain either a wire loop including the abradable component for single-stage wear detection or multiple loops including multiple abradable components for multi-stage wear detection. The single-stage construction indicates a single stage of wear of the brake pads. When a first predetermined thickness of the brake pad is reached, the abradable component is exposed to braking friction. Over time, the abradable component is worn open by the braking friction. When worn open, the resistance of the brake pad wear sensor 105 is altered and the change in resistance is detected by the ECU 107. In the multi-stage construction, multiple stages of wear of the brake pad occur with each stage indicating a predetermined brake pad thickness. When a second predetermined thickness is reached, a second stage loop is exposed to braking friction. When the second stage is worn open, another change in resistance is detected by the ECU 107. In the single-stage or the multistage constructions, the ECU 107 may send a signal to an operator of the vehicle 101, via an indicator (e.g., a light, a sound, or haptic feedback), indicating the first and/or the second stage of wear of the brake pad. The indicator may be a different type depending on which stage of wear is detected by the ECU 107.

Figure 2:
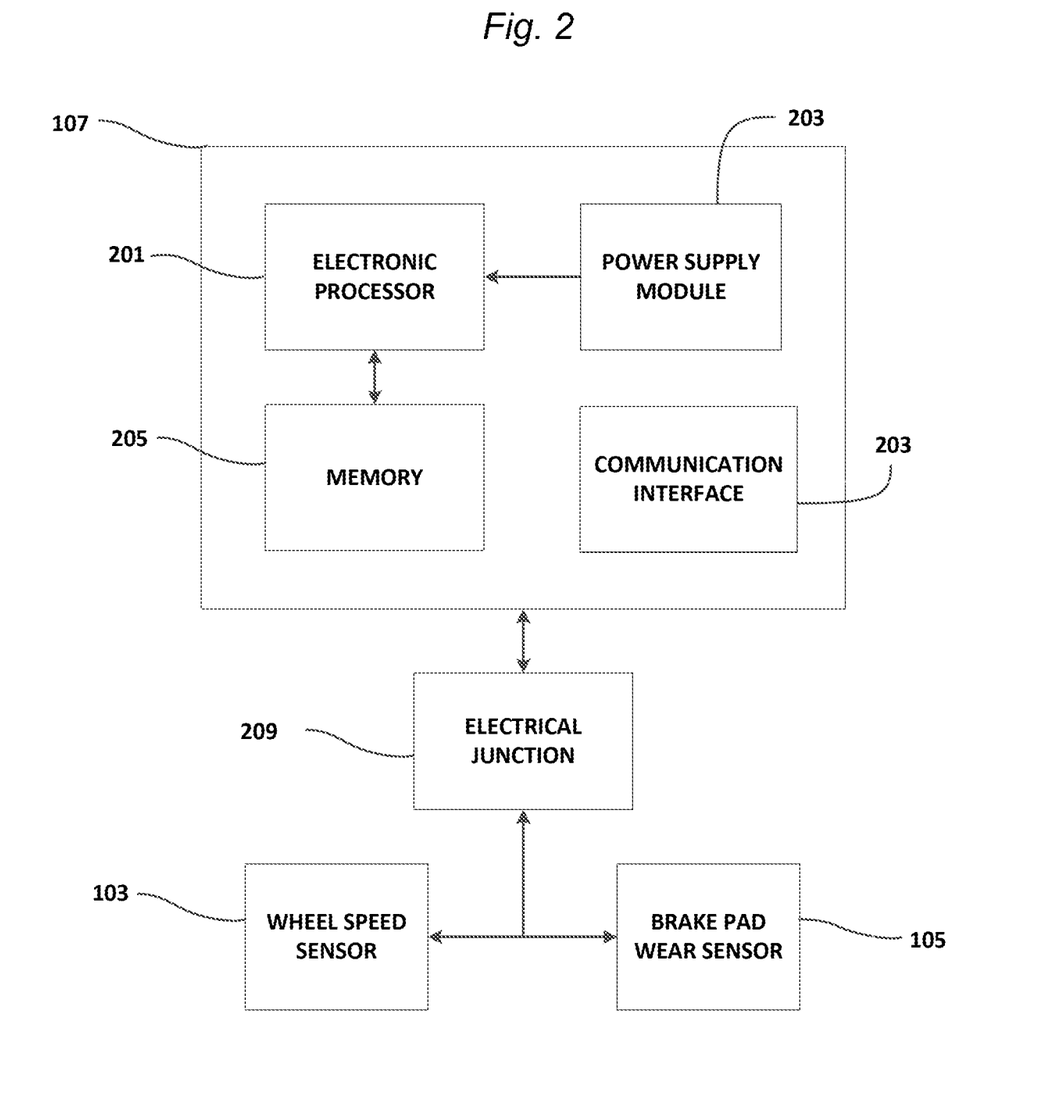
FIG. 2 is a block diagram of an electronic control unit that receives signals from the integrated wheel speed sensor and brake pad wear sensor of FIG. 1.

FIG. 2 illustrates the ECU 107 and associated electrical connections. It should be noted that the ECU 107 refers to hardware-based control circuitry integrated into an automotive electronic control unit for executing software instructions to perform the methods described herein. For example, the ECU 107 may include a microprocessor, microcontroller, or other computing device. The ECU 107 may include one or more electronic control units, one or more memory modules including non-transitory computer-readable medium, one or more input/output interfaces, and various connections (e.g., a system bus) connecting the components.

In the illustrative example, the ECU 107 includes, an electronic processor 201 (e.g., a programmable microprocessor, microcontroller, or other computing device), a power supply module 203, a non-transitory, machine-readable memory 205, and a communication interface 207. The electronic processor 201 is communicatively connected to the memory 205 and is configured to retrieve from memory 205 and execute, among other things, instructions related to the control processes and methods described herein. In other embodiments, the ECU 107 includes additional, fewer, or different components.

The ECU 107 is electrically connected to the wheel speed sensor 103 and the brake pad wear sensor 105 via an electrical junction 209. The electrical junction 209 may include various types of wiring connections and/or wiring harnesses that allow plugin compatibility with the wheel speed sensor 103 and the brake pad wear sensor 105. In some constructions, the electrical junction 209 is positioned in close proximity to the wheel speed sensor 103 and the brake pad wear sensor 105. In such a construction, an operator may access the electrical junction 209 from a wheel well of the vehicle 101.

The communication interface 207 provides an communication link between the ECU 107 and other electrical systems of the vehicle 101. For example, the communication interface 207 may communicate with an antilock braking system control unit or an electronic stability control unit (not shown). The communication interface 207 may communicate with the other electrical systems of the vehicle 101 through a vehicle communication bus. In such an example, the communication interface 207 controls transmission and reception of signals from the vehicle communication bus. The communication interface 207 may communicate by means of a protocol such as J1939 or controller area network (CAN) protocol. In other examples, the communication interface 207 communicates with the external modules and control units depending on the needs of the specific application. In some embodiments, the communication interface 207 sends information from the wheel speed sensor 103 and the brake pad wear sensor 105 to other automotive control units.

In the constructions illustrated in FIGS. 3-7, the wheel speed sensor 103 and the brake pad wear sensor 105 are integrated into a two-wire electrical connection with the ECU 107. In such constructions, a signal from the wheel speed sensor 103 and a condition indicative of the state of the brake pad wear sensor 105 may be read or monitored by different application specific integrated circuits (ASICs) within the ECU 107. Alternatively, the wheel speed sensor 103 and the brake pad wear sensor 105 can be electrically connected to more than one ECU. Furthermore, since the power line 303 of the wheel speed sensor 103 is regulated by the ECU 107, external electrical disturbances on the power line 303 of the wheel speed sensor 103 are minimized. As a consequence, interference generated by the brake pad wear sensor 105 does not interfere with the signal line 301 of the wheel speed sensor 103. Various configurations of the wheel speed sensor 103 and brake pad wear sensor 105 integrated with a common electrical pathway are described in the following embodiments.

Figure 3:
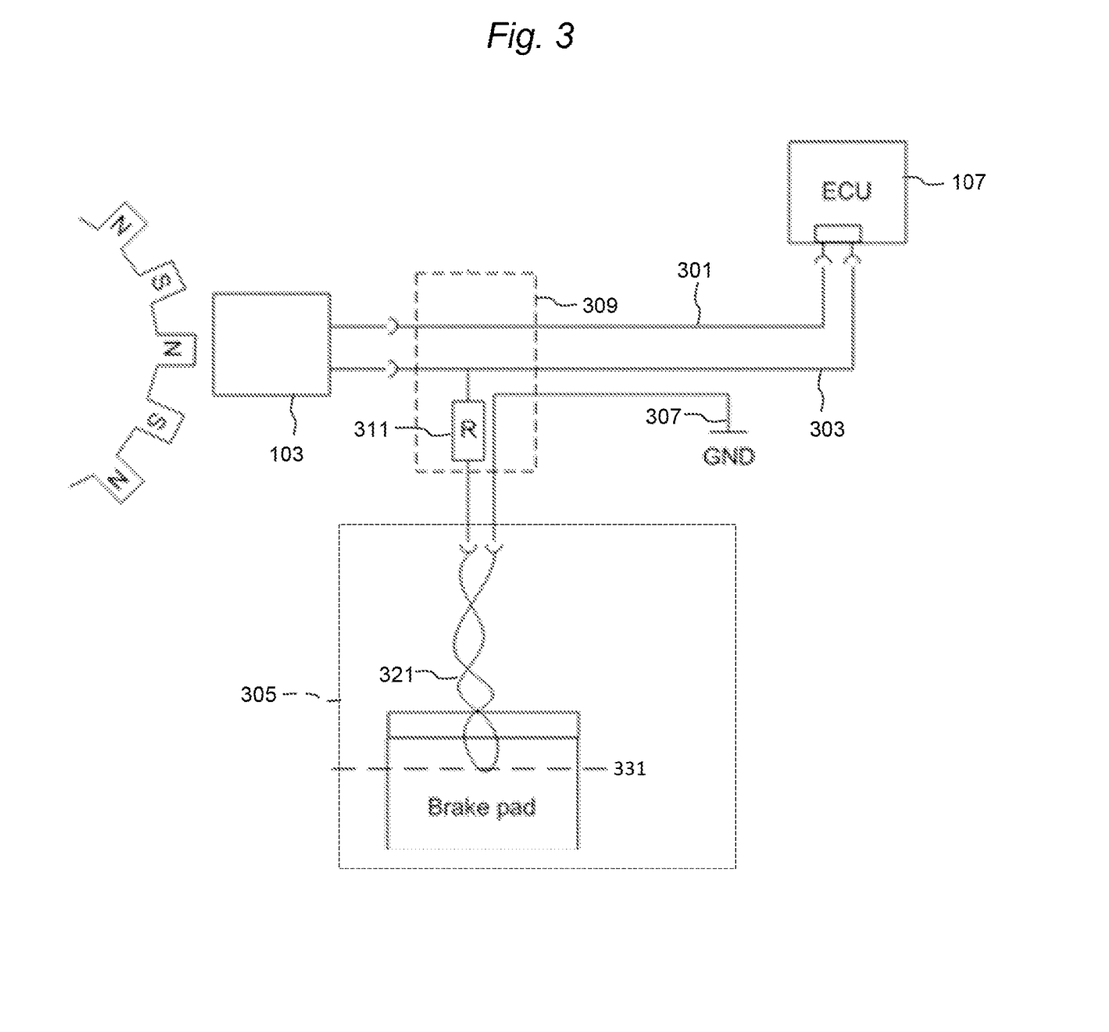
FIG. 3 is a schematic diagram of the integrated wheel speed sensor and brake pad wear sensor of FIG. 1 in a single stage configuration.

FIG. 3 illustrates an embodiment of a single-stage configuration. The single-stage configuration includes the ECU 107 and the wheel speed sensor 103. This configuration also includes a signal line 301, a power line 303, a brake pad wear sensor 305, a ground terminal 307, an electrical junction 309, and an load resistance 311 (e.g., a load resistor). The ECU 107 is communicatively coupled to the wheel speed sensor 103 via the signal line 301 and communicatively coupled to the brake pad wear sensor 305 via the power line 303. In some embodiments, the signal line 301 and the power line 303 constitute the only wires connected between the ECU 107 and the electrical junction 309. The power line 303 has a first end connected to the ECU 107, a second end connected to the wheel speed sensor 103, and a third end connected to the brake pad wear sensor 305. The electrical junction 309 is electrically connected between the wheel speed sensor 103 and the ECU 107 on the signal line 301 and also electrically connected between the wheel speed sensor 103, the brake pad wear sensor 305, and the ECU 107. The load resistance 311 may be located within or proximal to the electrical junction 309. In addition, the load resistance 311 is electrically connected between the power line 303 and the brake pad wear sensor 305. The brake pad wear sensor 305 includes an abradable wire loop 321 including a first end and a second end. The first end may be electrically connected to the load resistance 311 and the second end may be electrically connected to ground. The abradable wire loop 321 passes through a brake pad and acts as a switch. For example, the abradable wire loop 321 is normally closed (e.g., when the brake pad is not worn). However, when the brake pad wears to a predetermined thickness 331, the abradable wire loop 321 opens the electrical connection to ground (i.e., causes an open circuit).

In such a configuration, the ECU 107 supplies a constant voltage or a constant current to the power line 303. When the abradable wire loop 321 is worn open, the abradable wire loop 321 electrically disconnects the connection between the power line 303 and the ground terminal 307. Since the load resistance 311 is removed from the circuit when the abradable wire loop 321 is worn open, the current and/or voltage on the power line 303 is affected. The ECU 107 detects the change in load via the change in supplied power (e.g., the current and/or voltage on the power line 303). The ECU 107 may then activate a brake pad wear indicator or estimate a value of a useful life of the brake pad.

Figure 4:
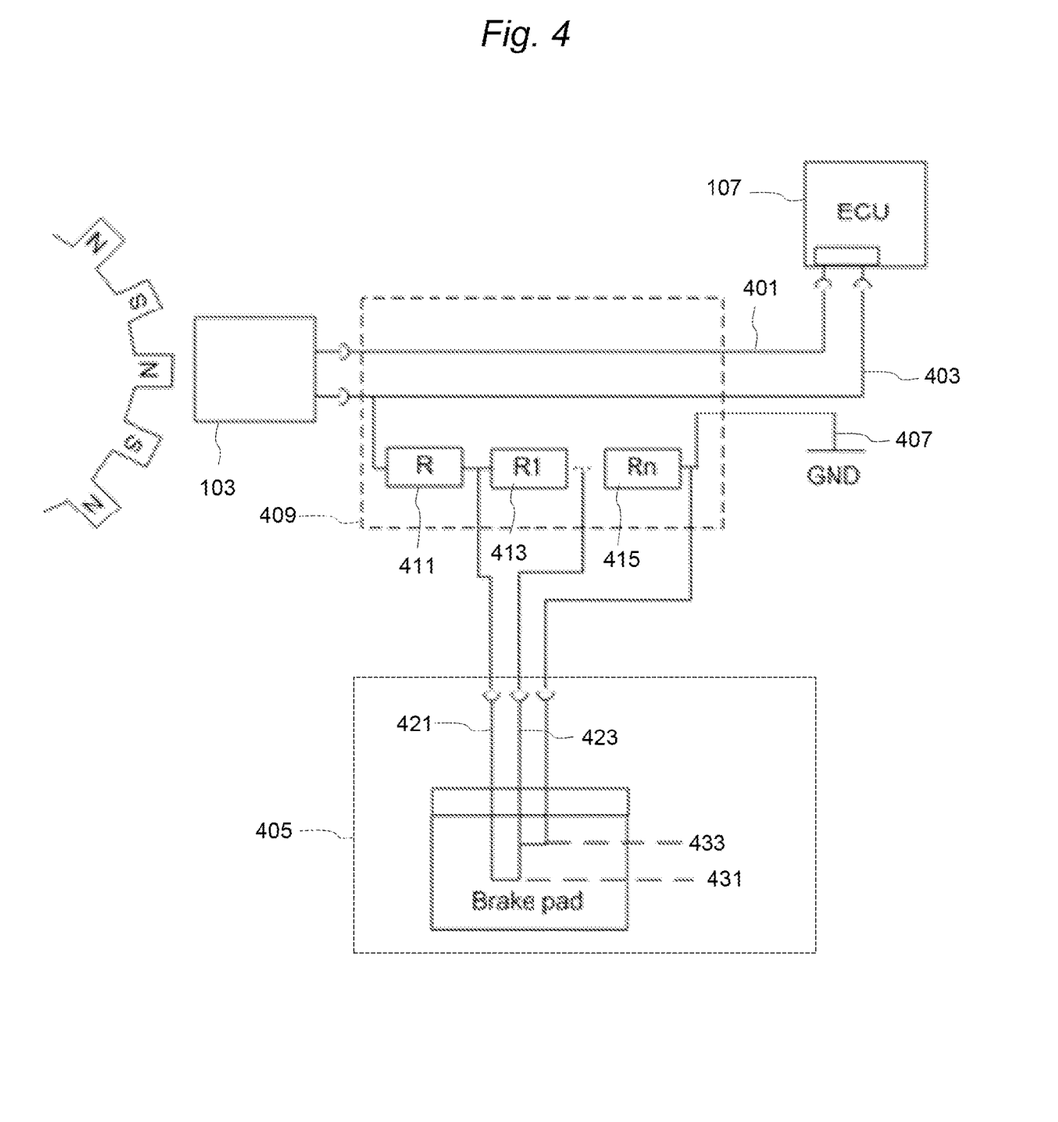
FIG. 4 is a schematic diagram of the integrated wheel speed sensor and brake pad wear sensor of FIG. 1 in a multistage configuration.

FIG. 4 illustrates an embodiment of a multi-stage configuration. The multi-stage configuration includes the ECU 107, the wheel speed sensor 103, and a plurality of resistances (e.g., resistors). This configuration also includes a signal line 401, a power line 403, a brake pad wear sensor 405, a ground terminal 407, an electrical junction 409, a load resistance 411, a first stage resistance 413, and a second stage resistance 415. The brake pad wear sensor 405 includes a first stage connection 421 associated with a first stage abradable wire loop 431 and a second stage connection 423 associated with a second stage abradable wire loop 433. The ECU 107 is communicatively coupled to the wheel speed sensor 103 via the signal line 401 and communicatively coupled to the brake pad wear sensor 405 via the power line 403. The ECU 107 is also electrically coupled to the wheel speed sensor 103 via the power line 403. The electrical junction 409 is electrically connected between the wheel speed sensor 103 and the ECU 107 on the signal line 401 and also electrically connected between the wheel speed sensor 103, the brake pad wear sensor 405, and the ECU 107. The load resistance 411, the first stage resistance 413, and the second stage resistance 415 may be located within or proximal to the electrical junction 409. In addition, the load resistance 411 is electrically connected between the power line 403 and a first stage connection 421. The first stage resistance 413 is electrically connected between the load resistance 411 and the second stage connection 423. The second stage resistance 415 is electrically connected between the first stage resistance 413 and the ground terminal 407. In addition, the first stage resistance 413 is connected in parallel with the first stage abradable wire loop 431, and similarly, the second stage resistance 415 is connected in parallel with the second stage abradable wire loop 433.

Figure 5:
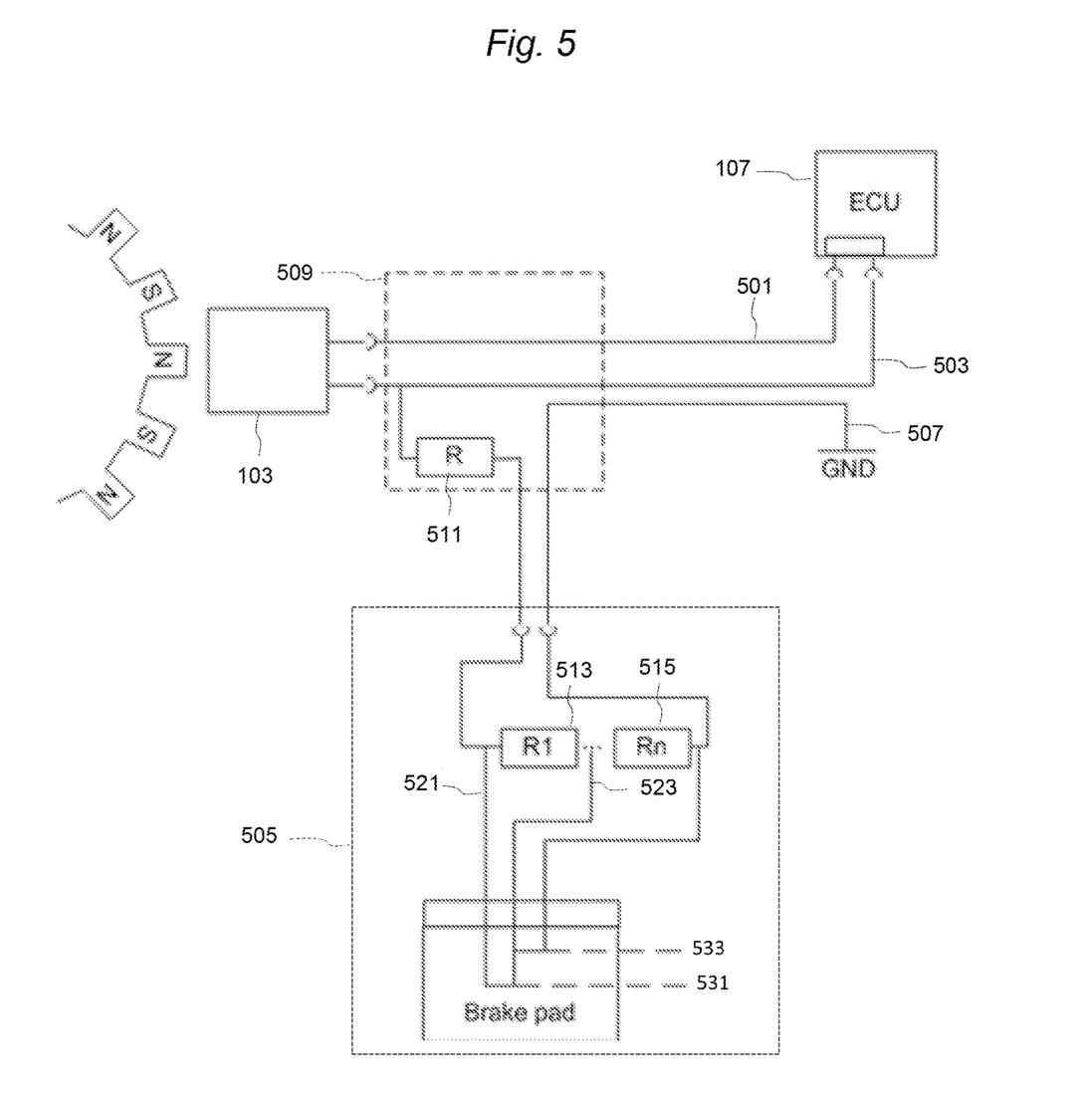
FIG. 5 is a schematic diagram of the integrated wheel speed sensor and brake pad wear sensor of FIG. 1 in yet another multistage configuration.

FIG. 5 illustrates another embodiment of a multi-stage configuration. The multi-stage configuration of FIG. 5 is similar to the multi-stage configuration of FIG. 4 and may operate in the same manner. The multistage configuration of FIG. 5 includes the ECU 107 and the wheel speed sensor 103. This configuration also includes a signal line 501, a power line 503, a brake pad wear sensor 505, a ground terminal 507, an electrical junction 509, a load resistance 511, a first stage resistance 513, and a second stage resistance 515. The brake pad wear sensor 505 includes a first stage connection 521 associated with a first stage abradable wire loop 531 and a second stage connection 523 associated with a second stage abradable wire loop 533. The ECU 107 is communicatively coupled to the wheel speed sensor 103 via the signal line 501 and communicatively coupled to the brake pad wear sensor 405 via the power line 503. The ECU 107 is also electrically coupled to the wheel speed sensor 103 via the power line 503. The electrical junction 509 is electrically connected between the wheel speed sensor 103 and the ECU 107 on the signal line 501 and also electrically connected between the wheel speed sensor 103, the brake pad wear sensor 505, and the ECU 107.

The load resistance 511 is positioned within or proximal to the electrical junction 509. The first stage resistance 513, and the second stage resistance 515 may be located within or proximal to the wheel speed sensor 103. The load resistance 511 is electrically connected between the power line 503 and a first stage connection 521. The first stage resistance 513 is electrically connected between the load resistance 511 and the second stage connection 523. The second stage resistance 515 is electrically connected between the first stage resistance 513 and the ground terminal 507. In addition, the first stage resistance 513 is connected in parallel with the first stage abradable wire loop 531, and similarly, the second stage resistance 515 is connected in parallel with the second stage abradable wire loop 533.

Figure 6:
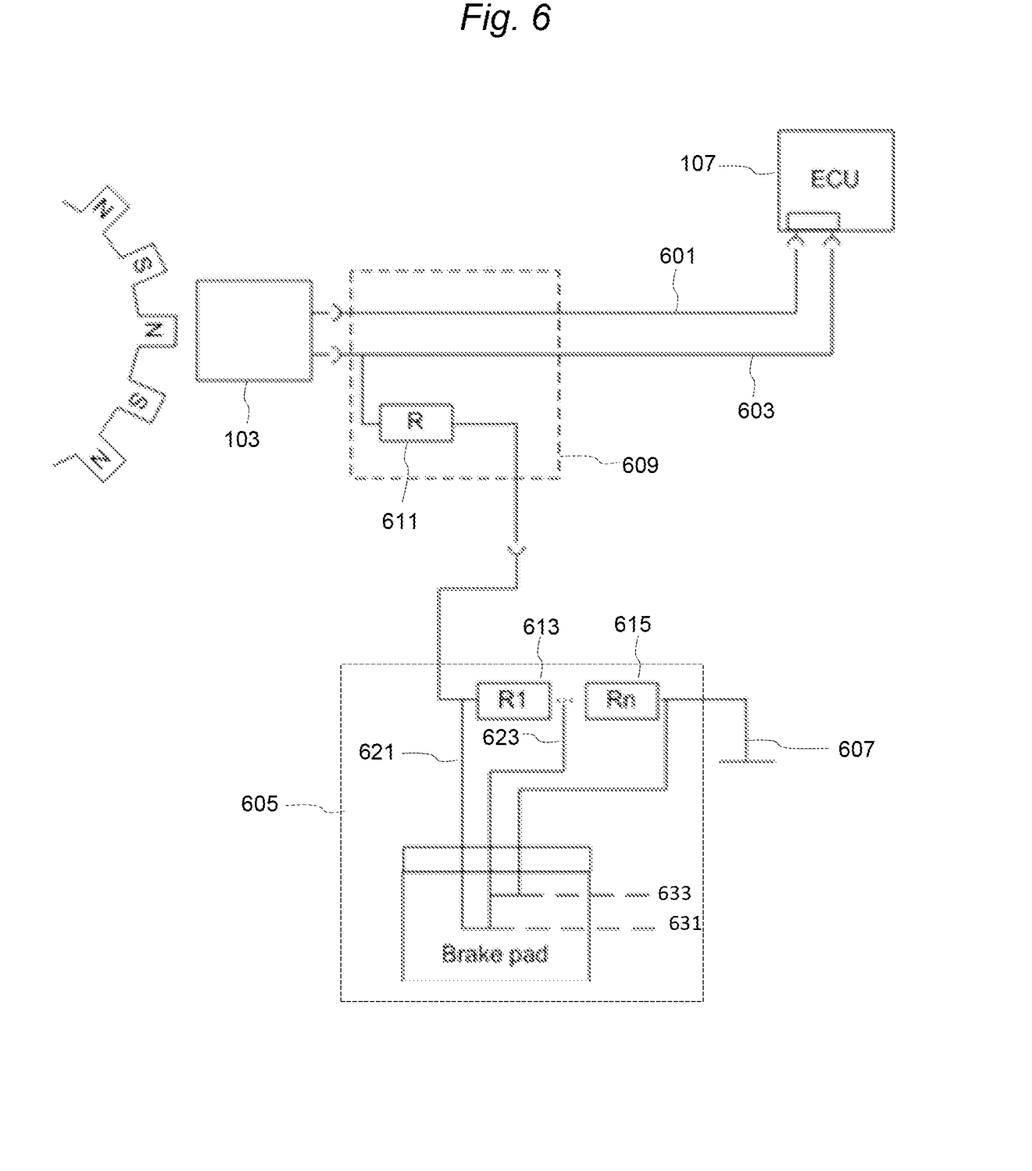
FIG. 6 is a schematic diagram of the integrated wheel speed sensor and brake pad wear sensor of FIG. 1 in yet another multistage configuration.

FIG. 6 illustrates yet another embodiment of a multi-stage configuration. The multi-stage configuration of FIG. 6 is similar to the multi-stage configuration of FIG. 5 and may operate in the same manner. The multistage configuration of FIG. 6 includes the ECU 107 and the wheel speed sensor 103. This configuration also includes a signal line 601, a power line 603, a brake pad wear sensor 605, a ground terminal 607, an electrical junction 609, a load resistance 611, a first stage resistance 613, and a second stage resistance 615 (e.g., load resistors). The brake pad wear sensor 605 includes a first stage connection 621 associated with a first stage abradable wire loop 631 and a second stage connection 623 associated with a second stage abradable wire loop 633. The ECU 107 is communicatively coupled to the wheel speed sensor 103 via the signal line 601 and communicatively coupled to the brake pad wear sensor 605 via the power line 603. The ECU 107 is also electrically coupled to the wheel speed sensor 103 via the power line 603. The electrical junction 609 is electrically connected between the wheel speed sensor 103 and the ECU 107 on the signal line 601 and also electrically connected between the wheel speed sensor 103, the brake pad wear sensor 605, and the ECU 107.

The load resistance 611 is positioned within or proximal to the electrical junction 609. The first stage resistance 613, and the second stage resistance 615 may be located within or proximal to the wheel speed sensor 103. The load resistance 611 is electrically connected between the power line 603 and a first stage connection 621. The first stage resistance 613 is electrically connected between the load resistance 611 and the second stage connection 623. The second stage resistance 615 is electrically connected between the first stage resistance 613 and the ground terminal 607. In addition, the first stage resistance 513 is connected in parallel with the first stage abradable wire loop 631, and similarly, the second stage resistance 615 is connected in parallel with the second stage abradable wire loop 633. The ground terminal 607 is connected to a grounded location of the vehicle 101 proximal to the brake pad wear sensor 605. As a consequence, a ground wire extending through the electrical junction 609 and to the ECU 107 is not necessary.

Figure 7:
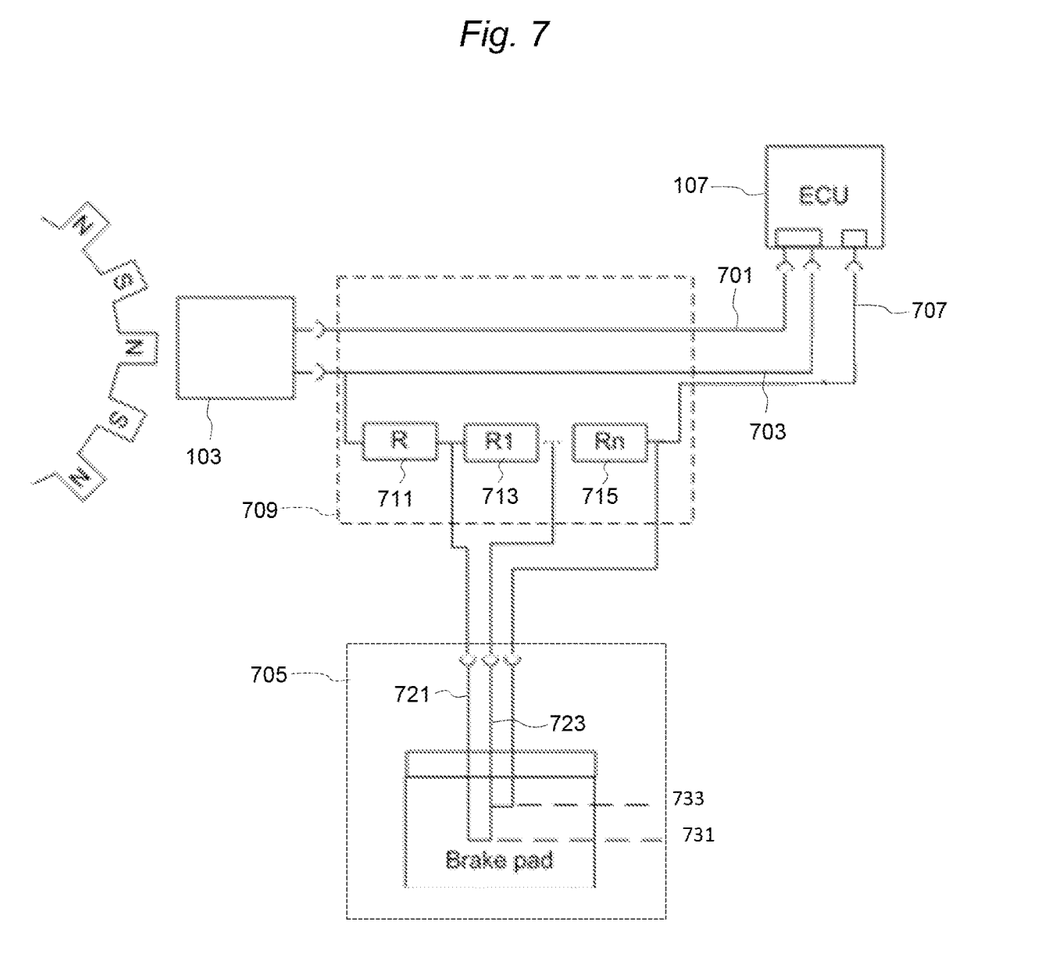
FIG. 7 is a schematic diagram of the integrated wheel speed sensor and brake pad wear sensor of FIG. 1 in yet another multistage configuration.

FIG. 7 illustrates yet another embodiment of a multi-stage configuration. The multi-stage configuration of FIG. 7 is similar to the multi-stage configuration of FIG. 4 and may operate in the same manner. In this configuration, ground is located at the ECU 107. The multistage configuration of FIG. 7 includes the ECU 107 and the wheel speed sensor 103. This configuration also includes a signal line 701, a power line 703, a brake pad wear sensor 705, a ground terminal 707, an electrical junction 709, a load resistance 711, a first stage resistance 713, and a second stage resistance 715. The brake pad wear sensor 605 includes a first stage connection 721 associated with a first stage abradable wire loop 731 and a second stage connection 723 associated with a second stage abradable wire loop 733. The ECU 107 is communicatively coupled to the wheel speed sensor 103 via the signal line 601 and communicatively coupled to the brake pad wear sensor 705 via the power line 703. The ECU 107 is also electrically coupled to the wheel speed sensor 103 via the power line 703. The electrical junction 709 is electrically connected between the wheel speed sensor 103 and the ECU 107 on the signal line 701 and also electrically connected between the wheel speed sensor 103, the brake pad wear sensor 705, and the ECU 107.

The load resistance 711 is positioned within or proximal to the electrical junction 709. The first stage resistance 713, and the second stage resistance 715 may be located within or proximal to the wheel speed sensor 103. The load resistance 711 is electrically connected between the power line 703 and a first stage connection 721. The first stage resistance 713 is electrically connected between the load resistance 711 and the second stage connection 723. The second stage resistance 715 is electrically connected between the first stage resistance 713 and the ground terminal 707. In addition, the first stage resistance 513 is connected in parallel with the first stage abradable wire loop 731, and similarly, the second stage resistance 715 is connected in parallel with the second stage abradable wire loop 733. The ground terminal 707 is positioned at the ECU 107. In this way, the ECU 107 provides a ground connection. As a consequence, an additional wire passes through the electrical junction 709 to provide a ground connection.

For each of the circuits illustrated in FIGS. 4 through 7, the first stage abradable wire loop 431, 531, 631, and 731 and the second stage abradable wire loop 433, 533, 633, and 733 pass through different portions of a brake pad and each acts as a one-time switch. For example, the first stage abradable wire loop 431, 531, 631, and 731 and the second stage abradable wire loop 433, 533, 633, and 733 are normally closed (e.g., when the brake pad is not worn). However, when the brake pad reaches a first predetermined thickness, the first stage abradable wire loop 431, 531, 631, and 731 opens thus disconnecting the first stage connection 421, 521, 621, and 721 from the second stage connection 423, 523, 623, and 723. As a consequence, current from the power line 403, 503, 603, and 703 passes through the first stage resistance 413, 513, 613, and 713. Similarly, when the brake pad reaches a second predetermined thickness, the second stage abradable wire loop 433, 533, 633, and 733 opens thus disconnecting the second stage connection 423, 523, 623, and 723 with the ground terminal 407, 507, 607, and 707. As a consequence, current from the power line 403, 503, 603, and 703 also passes through the second stage resistance 415, 515, 615, and 715. Therefore, total resistance seen by the ECU 107 via the power line 403, 503, 603, and 703 changes as the brake pad becomes worn. In particular, when the first stage abradable wire loop 431, 531, 631, and 731 and the second stage abradable wire loop 433, 533, 633, and 733 each open due to wear at each predetermined brake pad thickness, the resistance seen by the ECU 107 via the power line 403, 503, 603, and 703 increases.

Figure 8:
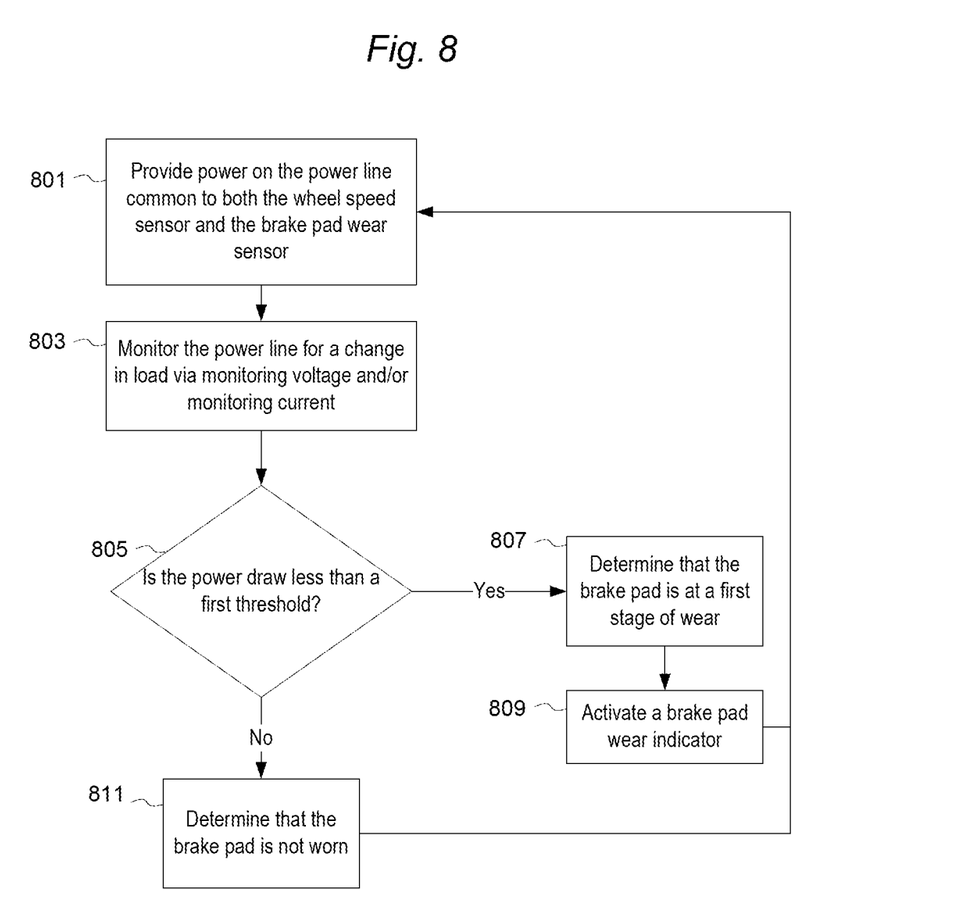
FIG. 8 is flowchart of a method of operating the integrated wheel speed sensor and brake pad wear sensor of FIG. 3.

FIG. 8 illustrates a method of operation of the circuits illustrated in FIG. 3. The ECU 107 provides power on the power line 303 common to both the wheel speed sensor 103 and the brake pad wear sensor 305 (step 801). Providing power may include providing a constant current source with a monitored voltage or a constant voltage source with a monitored current. The ECU 107 monitors the power line 303 for a change in load via the monitored current and/or voltage (step 803). The ECU 107 detects the change in load. The ECU 107 determines whether the power draw on the power line 303 is less than a first threshold (step 805). If the power draw is less than the first threshold, the ECU 107 determines that the brake pad is at a first stage of wear (step 807). When the brake pad is at the first stage of wear, the ECU 107 activates a brake pad wear indicator (step 809). If the power draw is greater than the first threshold, the ECU 107 determines that the brake pad is not worn (step 811).

Figure 9:
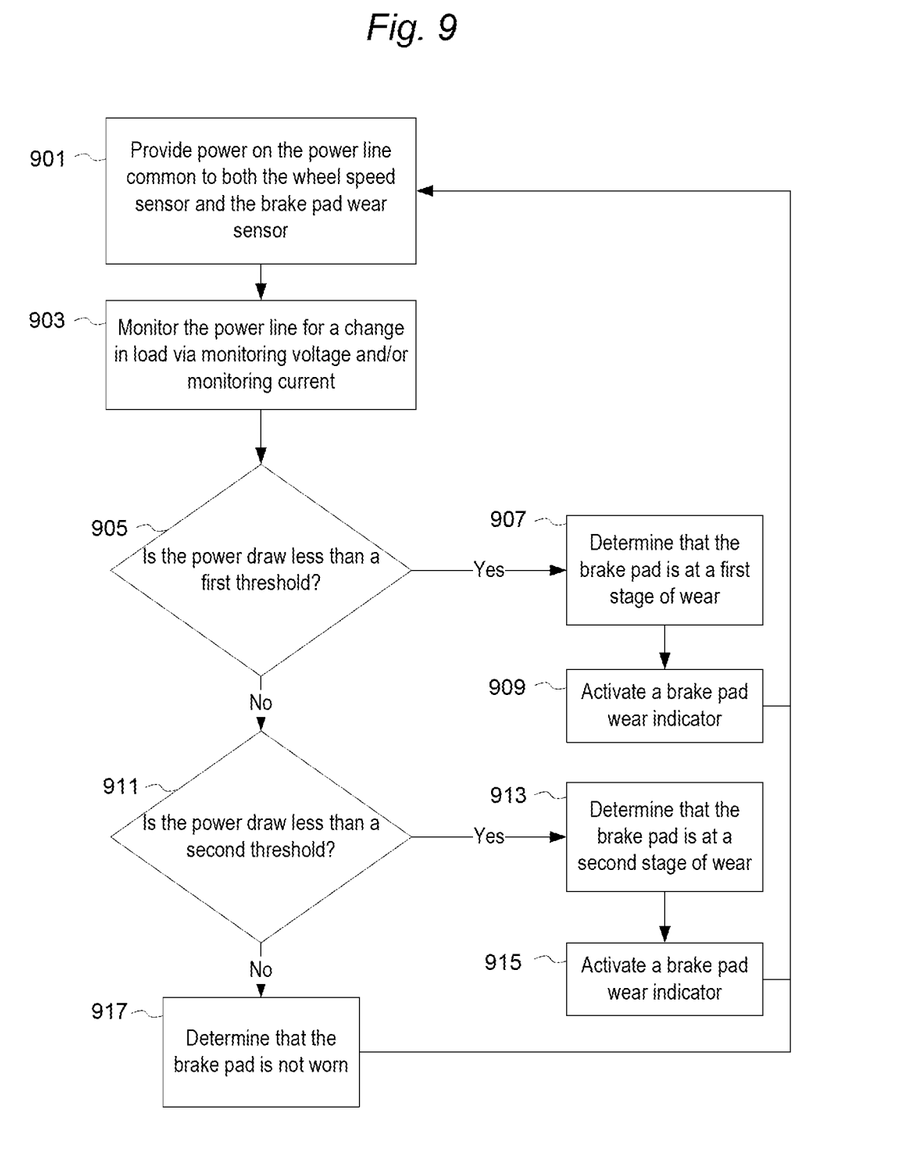
FIG. 9 is a flowchart of a method of operating the integrated wheel speed sensor and brake pad wear sensor of FIGS. 4-7.

Similarly, FIG. 9 illustrates a method of operation of the circuits illustrated in FIGS. 4-7. The ECU 107 provides power on the power line 403, 503, 603, and 703 common to both the wheel speed sensor 103 and the brake pad wear sensor 405, 505, 605, and 705 (step 901). Providing power may include providing a constant current source with a monitored voltage or a constant voltage source with a monitored current. The ECU 107 monitors the power line 403, 503, 603, and 703 for a change in load via the monitored current and/or voltage (step 903). The ECU 107 detects the change in load. The ECU 107 determines whether the power draw on the power line 403, 503, 603, and 703 is less than a first threshold (step 905). If the power draw is less than the first threshold, the ECU 107 determines that the brake pad is at a first stage of wear (step 907). When the brake pad is at the first stage of wear, the ECU 107 activates a brake pad wear indicator (step 909). If the power draw is greater than the first threshold, the ECU 107 determines if the power draw is less than a second threshold (step 911). If the power draw is less than the second threshold, the ECU 107 determines that the brake pad is at a second stage of wear (step 913). When the brake pad is at the second stage of wear, the ECU 107 activates a brake pad wear indicator (step 915). Conversely, if the power draw is not less than the second threshold, the ECU 107 determines that the brake pad is not worn (step 917). The ECU 107 may perform various actions on determination of the first stage of wear or the second stage of wear. For example, the ECU 107 may activate a different wear indicator depending on which stage of wear is determined. In addition, the ECU 107 may output wear indications via the communication interface 207 to other control units within the vehicle 101.

As a further example, in some embodiments, the ECU 107 monitors current draw on the power line 303, 403, 503, 603, and 703 and determines, based on the current draw, the wear level of the brake pads. In addition, the ECU 107 monitors a supply voltage level on a power terminal of the ECU 107. Using the supply voltage level and the current draw, the ECU 107 distinguishes between a change in the amount of current due to a resistance change and a change in the amount of current due to noise or disruption in a supply voltage.

The timing and frequency of current monitoring, by the ECU 107, may be configured and adjusted in the ECU 107. For example, the ECU 107 may be configured to monitor the current on the power line 303, 403, 503, 603, and 703 at various increments, for example, once per ignition cycle, once per thousand miles, or every 10 seconds. The current monitoring can also be event-triggered, such as after braking at low speed. Braking may clean a surface of the brake pad. As a consequence, current monitoring may be triggered after braking to reduce faulty or intermittent connections caused by contamination, such as salt bridges on the brake pads.

It should be noted that the load resistance 311, 411, 511, 611, and 711, the first stage resistance 413, 513, 613, and 713, and the second stage resistance 415, 515, 615, and 715 may be placed at different positions, such as, for example, at the electrical junction 309, 409, 509, 609, and 709 proximal to where the power line 303, 403, 503, 603, and 703 splits. They may also be placed in a connector of the brake pad wear sensor 305, 405, 505, 605, and 705, in the first stage abradable wire loop 431, 531, 631, and 731, or in the second stage abradable wire loop 433, 533, 633, and 733. In addition, in some embodiments, the ground terminal 307, 407, 507, 607, 707 is permanently connected to a safe low ohmic ground, either in the ECU 107 or to an external ground. The ground path may be connected via a wire harness or another connection.

The systems and methods described above are also applicable a system with a non-abradable sensor head for the brake pad wear sensor 305, 405, 505, 605, and 705. For example, switches using different technologies including, for example, mechanical, magnetic, capacitive, or inductive switches may be used. The articulation of the switches can be realized by the displacement between the brake pad backing plate, a moving caliper, or piston and a reference location. The reference location may be defined on the brake caliper or other fixed position.

Thus, the invention provides, among other things, integrated routing of portions of a wheel speed sensor and a brake pad wear sensor.

What is claimed is:

1. An integrated monitoring system for a vehicle, the system comprising:
    a brake pad wear sensor, the brake pad wear sensor including a resistor and an abradable wire loop electrically coupled serially relative to ground, wherein the abradable wire loop is positioned within a brake pad and adapted to form an open circuit in the brake pad wear sensor when the brake pad wears to a predetermined thickness;
    a wheel speed sensor including an electrical power input and a digital signal output;
    an electronic control unit including an electrical power output and a digital signal input; and
    an electrical junction component that is
        selectively coupleable to the digital signal output of the wheel speed sensor and the digital signal input of the electronic control unit to provide a wheel speed sensor signal line connected between the wheel speed sensor and the electronic control unit, and
        selectively coupleable to the electrical power output of the electronic control unit and the electrical power input of the wheel speed sensor to provide a power line connected between the wheel speed sensor and the electronic control unit,
    wherein the wheel speed sensor is configured to receive operating power from the electronic control unit through the power line and to transmit a signal indicative of wheel speed to the electronic control unit through the wheel speed sensor signal line,
    wherein the brake pad wear sensor is coupled to the power line at the electrical junction component and configured to draw electrical power from the power line to the ground when the brake pad has not yet worn to the predetermined thickness,
    wherein the brake pad wear sensor is configured to alter an electrical load of the power line in response to a brake pad condition by creating the open circuit between the power line and the ground when the brake pad wears to the predetermined thickness such that the electrical power drawn by the brake pad wear sensor from the power line is reduced and the signal indicative of the wheel speed is still detectable on the signal line when the open circuit occurs in the brake pad wear sensor, and
    wherein the electronic control unit is configured to
        monitor the wheel speed sensor signal line for a signal indicative of the wheel speed, and
        monitor the power line for a change in the electrical load indicative of the brake pad condition.

2. The integrated monitoring system of claim 1, wherein the electronic control unit is further configured send a signal indicative of a state of the brake pad wear sensor to an operator of the vehicle.

3. The integrated monitoring system of claim 1, wherein the power line and the wheel speed sensor signal line are the only wires connected between the electronic control unit and the electrical junction component.

4. The integrated monitoring system of claim 1,
    wherein the resistor is a first resistive element,
    wherein the abradable wire loop is a first abradable wire loop, and
    wherein the brake pad wear sensor includes
        a brake pad;
        a plurality of resistive elements including the first resistive element; and
        a plurality of abradable wire loops in the brake pad each associated with one of the plurality of resistive elements, each of the plurality of abradable wire loops connected in parallel with each of the associated resistive elements, wherein the plurality of abradable wire loops includes the first abradable wire loop, and wherein each abradable wire loop of the plurality of abradable wire loops is adapted wear at a different predetermined thickness of the brake pad.

5. The integrated monitoring system of claim 4, wherein at least one of the plurality of resistive elements is located proximal to the electrical junction component.

6. The integrated monitoring system of claim 4, wherein at least one of the plurality of resistive elements is located proximal to the brake pad wear sensor.

7. The integrated monitoring system of claim 4, wherein the brake pad wear sensor includes a ground wire connected between at least one of the abradable wire loops and a ground terminal.

8. The integrated monitoring system of claim 7, wherein the ground terminal is located proximal to the brake pad wear sensor.

9. The integrated monitoring system of claim 7, wherein the ground terminal is located on the electronic control unit.

10. The integrated monitoring system of claim 1, wherein the electronic control unit is configured to provide a constant voltage to the power line and is configured to monitor the power line for a change in the electrical load indicative of the brake pad condition by monitoring the power line for a change in current.

11. The integrated monitoring system of claim 1, wherein the electronic control unit is configured to provide a constant current to the power line and is configured to monitor the power line for a change in the electrical load indicative of the brake pad condition by monitoring the power line for a change in voltage.

12. The integrated monitoring system of claim 1, wherein the wheel speed sensor is configured to generate a digitized signal indicative of a sensed wheel speed, and wherein the wheel speed sensor is configured to transmit the signal indicative of the wheel speed to the electronic control unit through the wheel speed sensor signal line by transmitting the digitized signal on the wheel speed sensor signal line.

* * * * *